3,047,504
PROCESS FOR TREATING COMPLEX ESTERS TO IMPROVE VISCOSITY STABILITY

Theodore J. Peters, Somerville, and John F. Collins, Elizabeth, N.J., assignors to Esso Research and Engineering Company, a corporation of Delaware
No Drawing. Filed Dec. 31, 1959, Ser. No. 863,107
12 Claims. (Cl. 252—56)

This invention relates to methods of treating synthetic esters to improve their viscosity stability characteristics. Particularly the invention relates to a method for improving the viscosity stability characteristics of a synthetic ester comprising treating the ester with an adsorbent and solvent.

The use of various diesters and complex esters as lubricating oils is well known to the art and has been described in numerous patents, e.g. U.S. 2,723,206; 2,743,234; 2,575,196; 2,705,724 and 2,723,286. In general, these synthetic ester lubricating oils are prepared from carboxylic acids, glycols, and alcohols. They have viscosity properties that are outstanding at both low and high temperatures, especially in comparison with mineral lubricating oils. Because of these characteristics, the synthetic ester oils have become of increasing importance in the field of lubrication. One of the most important current applications of such compounds is in the lubrication of aviation gas turbine systems, such as are used in the turbo jet and turbo prop type of aircraft.

The ester oils operable as base oils in the compositions of this invention comprise hydrocarbon chains interrupted with ester linkages. Such esters will include diesters and complex esters.

The diesters are prepared from dicarboxylic acids fully esterified with monohydric alcohols, or from glycols fully esterified with monocarboxylic acids. The total number of carbon atoms in the diester molecule is about 20 to 36, preferably 22 to 26. Preferred dicarboxylic diesters are those of the formula:

ROOCR'COOR wherein R represents a straight or branched chain alkyl radical of an alkanol having about 6 to 13 carbon atoms, and R' is a straight or branched chain $C_2$ to $C_8$ divalent saturated aliphatic hydrocarbon radical. Examples of such diesters include: di(2-ethylhexyl) sebacate, which is referred to herein as dioctyl sebacate, di(n-nonyl) adipate, di($C_8$ Oxo) azelate, di(n-heptyl) isosebacate, di($C_{10}$ Oxo) adipate, di($C_8$ Oxo) adipate, di(2-ethylhexyl) adipate, di($C_7$ Oxo) adipate, di($C_8$ Oxo) trimethyl adipate, di($C_{13}$ Oxo) pimelate, etc. Other operable diesters are those prepared from glycols and monocarboxylic acids such as dipropylene glycol dipelargonate and polyethylene glycol 200 dicaproate. Diesters prepared from the Oxo alcohols, which are isomeric mixtures of highly branched chain aliphatic primary alcohols, are particularly desirable. The Oxo alcohols have a very high degree of branching in the hydrocarbon chain, which results in diester oils having low pour points and low viscosity at low temperature. These alcohols are prepared from olefins, such as polymers and copolymers of $C_3$ and $C_4$ monoolefins, which are reacted with carbon monoxide and hydrogen in the presence of a cobalt-containing catalyst, such as a cobalt carbonyl catalyst, at temperatures of about 300° to 400° F., and under pressures of about 1000 to 3000 p.s.i. to form aldehydes. The resulting aldehyde product is then hydrogenated to form the alcohol which is then recovered from the hydrogenation product.

The complex esters which may be used are formed by esterification reactions between a dicarboxylic acid, a glycol, and an alcohol and/or a monocarboxylic acid. These esters may be represented by the following formulas:

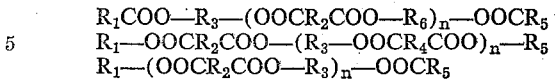

$R_1COO—R_3—(OOCR_2COO—R_6)_n—OOCR_5$
$R_1—OOCR_2COO—(R_3—OOCR_4COO)_n—R_5$
$R_1—(OOCR_2COO—R_3)_n—OOCR_5$ wherein $R_1$ and $R_5$ are alkyl radicals of a monohydric alcohol (e.g. alkanols), or a monocarboxylic acid (e.g. alkanoic acids), $R_2$ and $R_4$ are hydrocarbon radicals of dicarboxylic acids (e.g. alkandioic acids), and $R_3$ and $R_6$ are divalent hydrocarbon or hydrocarbon-oxy radicals, such as $—CH_2—(CH_2)_n—$ or $—CH_2CH_2(OCH_2CH_2)_n—$, or $—CH_2—CH(CH_3)OCH_2CH(CH_3)—$, derived from an alkylene glycol or polyalkylene glycol. "$n$" in the complex ester molecule, will usually range from 1 to 6, and depends primarily upon the properties of the product desired which is also affected by the relative molar ratio of the glycol or polyglycol to the dicarboxylic acid. In preparing the complex ester, there will always be some simple ester formed, i.e. $n=0$, but this will generally be a minor portion.

Some specific materials used in preparing the above types of complex esters are as follows: monohydric alcohols or alkanols such as methyl alcohol, ethyl alcohol, n-butyl alcohol, 2-ethylbutyl alcohol, 2-ethylhexanol n-hexyl alcohol, $C_8$ Oxo alcohol and $C_{10}$ Oxo alcohol, etc.; the corresponding fatty or monocarboxylic acids; dicarboxylic acids having 4 to 54 carbon atoms such as succinic acid, adipic acid, isosebacic acid, thioglycolic acid, sebacic acid, dioleic, trioleic, azelaic acid, phthalic acids, the dimer and trimer of linoleic acids, etc.; glycols such as methylene and ethylene glycols and any of their paraffinic homologues up to 36 carbon atoms, e.g. ethylene glycol, propylene glycol, hexamethylene glycol, 2-ethylhexanediol-1,3, dimer glycol, 2,4 dimethyl-2-alkoxymethyl pentanediol-1,5, trimethylene glycol, etc. as well as polyethylene glycols containing 2 to 10 oxyethylene units and polypropylene glycols containing 2 to 10 oxypropylene units. In general these complex esters will have a total of 20 to 80, preferably 30 to 50 carbon atoms. These complex esters and methods for their preparation are well known in the art and have been well described in the literature.

Complex type synthetic ester oils are, in general, quite thick and viscous while synthetic diesters are relatively thin and fluid. Neither, by itself, is a satisfactory lubricant in turbo prop engines, but it has been found that a blend of the two in varying proportions makes a most satisfactory lubricant for such engines. Although these lubricant blends have outstanding viscosity properties at extreme temperature ranges, it is also most essential for satisfactory engine performance that the viscosity remain constant at low temperature conditions. As an indicia of this important characteristic, the Military has set a certain specification (MIL-L-7808C). This specification is that at —65° F. the viscosity stability should remain constant within a range of 0 to 6% between 35 minutes and 215 minutes in a kinematic viscosity test performed with an Ubbelohde viscosimeter.

The method of this invention is particularly adapted towards overcoming the hitherto difficult viscosity requirements at —65° F. It has been found that by utilizing critical proportions of certain solvents such as esters of dibasic acids described above, and paraffinic hydrocarbons of from 6 to 16 carbon atoms in conjunction with an adsorbent such as alumina, silica gel, fuller's earth, adsorbent clay, activated bauxite, ion exchange resins, and the like, a complex synthetic ester lubricant (such as described above) will meet the requirements of viscosity stability at —65° F. In fact, a viscosity stability of 0.0% may be obtained by this method.

An additional benefit which inures from the technique of the invention is that the treated complex ester is much less corrosive to lead, than before treatment.

The process, in general, consists of treating or blending the required proportions of the complex synthetic ester in a selected solvent within a range of from 0–200° F., adding 0.1 to 10 wt. percent per treat of adsorbing material and agitating for approximately ½ to 10 hours. In general, from 1 to 10 vol. percent of complex ester is treated with from 90 to 99% of the solvent. At the end of this period the spent adsorbent is filtered from the blend and the identical process repeated if necessary. The blend is then filtered through a filter and adjusted to the final desired consistency by varying the amount of diester as needed. If the solvent is to form a part of the finished lubricant, as is the case when the diester is the solvent, then it may be left in the blend, otherwise it can be separated by distillation.

The invention will be further illustrated and understood by the following examples which are the preferred embodiments:

EXAMPLE I (A) *Conventional prior method.*—A sample of a complex synthetic ester lubricant was prepared by reacting together two molar proportions of sebacic acid, two molar proportions of 2-ethylhexanol, and one molar proportion of polyethylene glycol having a molecular weight of about 200. The procedure used was as follows:

In a 10-gallon Pfaudler reactor are placed 9 lbs. of polyethylene-glycol 200, 20 lbs. of sebacic acid and 5 lbs. of toluene. Sodium bisulfate catalyst (46 g.) is added and the mixture refluxed until water ceases to distill. After removing the toluene as completely as possible by distillation, 18 lbs. of 2-ethylhexanol is added to the reactor and esterification continued until reaction is essentially complete. Each esterification step requires about 3 hours. The ester is then heated at 450° F. at about 10 to 15 mm. pressure for about 3 hours. After cooling, the product is filtered and washed first with a 10% aqueous solution of sodium carbonate and then twice with water in order to remove most of the acidic impurities. The final product is then stripped at 250° F./15 mm. Hg. The product was then admixed with about 5 wt. percent, based on the weight of ester and alumina, of a particulated alumina having particle sizes of from 48 to 100 mesh i.e., from 0.295 to 0.147 mm. The contact was maintained with agitation for about 2 hours at a temperature of about 75° F. The treated product was then filtered to remove the alumina.

(B) *The additional treatment.*—The technique of A above illustrates a conventional method of preparing a complex ester. An illustration of the application of the technique of the invention to the complex ester follows:

Twenty-five ml. of the complex ester of A above was blended with 475 ml. of dioctyl sebacate as the solvent, and the blend of the two then raised to a temperature of 120° F. 22.7 grams or 5 wt. percent based on the total composition of $Al_2O_3$ were added to the blend and the mixture agitated for 4 hours. At the end of the 4-hr. period the spent $Al_2O_3$ was filtered from the blend and the process was repeated once more in a similar treating cycle. It was not necessary in this example to remove the solvent by distillation since the diester forms part of the ultimate complex ester-diester blend. If the solvent were paraffinic, it would be so necessary.

The final blend was then tested for viscosity stability by means of a kinematic viscosity test. The kinematic viscosity in centistokes of the lubricant is measured after 35 minutes at −65° F. and then again after 215 minutes, at −65° F. When both measurements are taken the difference between the two numerical measurements divided by the viscosity at 35 minutes is the viscosity stability at −65° F. and is expressed as a percentage. This is in essence the percent of change in viscosity.

The viscosity data for the complex ester-diester blend of the B portion of the example are as follows:

Kinematic vis. @ −65° F. after 35 min\_\_\_\_\_cs\_\_ 11,119
Kinematic vis. @ −65° F. after 215 min\_\_\_cs\_\_ 11,119
Vis. stability @ −65° F_____percent\_\_ 0.0

Control

This experiment consisted of the preparation of a complex ester-diester blend using 5 vol. percent of the untreated complex ester and 95 vol. percent of the dioctyl sebacate for comparison with the test results of the other examples. The viscosity data follow:

Kinematic vis. @ −65° F. after 35 min\_\_\_\_\_cs\_\_ 11,968
Kinematic vis. @ −65° F. after 315 min\_\_\_\_\_cs\_\_ 12,472
Vis. stability_____percent\_\_ 4.2

EXAMPLE II

The laboratory treating procedure in Example IB was duplicated except that 475 ml. of heptane was used as a solvent in place of the dioctyl sebacate when treating the complex ester. After the last $Al_2O_3$ treating cycle the solvent was removed by stripping under vacuum. Five vol. percent of the treated complex ester was then blended with 95 vol. percent of the dioctyl sebacate. The viscosity data obtained on this diester-complex ester blend are as follows:

5% COMPLEX ESTER, 95% HEPTANE

Kinematic vis. @ −65° F. after 35 min. \_\_\_\_cs\_\_ 11,203
Kinematic vis. @ −65° F. after 215 min. \_\_\_cs\_\_ 11,203
Vis. stability _____percent\_\_ 0.0

EXAMPLE III

The laboratory treating procedure of Example II was duplicated except that 475 ml. of hexane was used in place of the heptane. The viscosity data obtained on this diester-complex ester are as follows:

5% COMPLEX ESTER, 95% HEXANE

Kinematic vis. @ −65° F. after 35 min. \_\_\_\_cs\_\_ 11,214
Kinematic vis. @ −65° F. after 215 min. \_\_\_cs\_\_ 11,214
Vis. stability _____percent\_\_ 0.0

EXAMPLE IV

The laboratory treating procedure of Example II was duplicated except that 450 ml. of heptane and 50 ml. of complex ester were used. The viscosity data following indicate that the treating concentration is critical.

10% COMPLEX ESTER, 90% HEPTANE

Kinematic vis. @ −65° F. after 35 min. \_\_\_\_cs\_\_ 11,651
Kinematic vis. @ −65° F. after 215 min. \_\_\_cs\_\_ 12,186
Vis. stability _____percent\_\_ 4.6

EXAMPLE V

The laboratory treating procedure of Example II was duplicated except that 450 ml. of hexane and 50 ml. of complex ester were used. The viscosity data following indicate that the treating concentration is critical.

10% COMPLEX ESTER, 90% HEXANE

Kinematic vis. @ −65° F. after 35 min. \_\_\_\_cs\_\_ 11,415
Kinematic vis. @ −65° F. after 215 min. \_\_\_cs\_\_ 11,807
Vis. stability _____percent\_\_ 4.6

EXAMPLE VI.—LEAD CORROSION STABILITY

A synthetic ester blend made up of a diester-complex ester of the same composition and treatment of Example I was tested for lead corrosivity in the S.O.D. Lead Corrosion Test. This lead corrosion test was carried out by rapidly rotating a bimetallic strip consisting of a lead strip and a copper strip bonded together in an oil sample maintained at 325° F., while air is bubbled through the sample. The weight loss of the lead strip is then determined and reported in milligrams lost per square inch of surface. The results of this test are summarized in the following table.

|  | 1 Hour | 4 Hours |
|---|---|---|
| Treated complex ester mg./in.² | −0.104 | −5.3 |
| Complex ester mg./in.², untreated by the method of the invention | −5.3 | −50.3 |

The data presented above show clearly the improvement in the lead corrosion tendencies, as well as in the very important low temperature characteristics of a finished turbo oil when it is formulated from a treated complex ester. All other pertinent inspections on the finished complex ester-diester blend are considered satisfactory. As illustrated by Examples I, II, and III, 95 vol. percent of solvent results in no change in viscosity. In the control an untreated ester-diester blend has a 4.2% change in viscosity. When 90 vol. percent of solvent is used as in Examples IV and V there is a substantial decrease in viscosity stability. Thus it is seen that both treatment by an adsorbent and a critical quantity of solvent are necessary to produce viscosity stable synthetic ester lubricating blends.

To further illustrate the invention, the complex esters can be subjected to the treatment described in Example IB but omitting the alumina treatment in the conventional complex ester preparation of Example IA. Thus Examples IB, II and III are exactly duplicated except that the alumina treatment in the conventional preparation of the complex ester as described in Example IA is eliminated.

What is claimed is:

1. A method of improving the viscosity stability of a complex ester, wherein said complex ester is formed from dicarboxylic acids, glycols, and a material selected from the group consisting of alcohols and monocarboxylic acids, and wherein said complex ester has from 20 to 80 carbon atoms, comprising blending about 5 vol. percent of a complex ester with about 95 vol. percent of a solvent selected from the group consisting of $C_6$ to $C_{16}$ paraffinic hydrocarbons and $C_{20}$ to $C_{36}$ aliphatic diesters, treating the blend with 0.1 to 10 wt. percent of an adsorbent with agitation for approximately ½ to 10 hours and at a temperature of from 0 to 200° F. and separating the adsorbent from the blend.

2. A method according to claim 1 wherein said complex ester has the formula:

$$R_1COO—R_3—(OOCR_2COO—R_6)_n—OOCR_5$$

wherein $R_1$ and $R_5$ are alkyl radicals derived from materials of the group consisting of alkanols and alkanoic acids, $R_2$ is an alkyl radical derived from an alkandioic acid, $R_3$ and $R_6$ are selected from the group consisting of divalent hydrocarbon and hydrocarbon-oxy radicals, $n$ is a number from 1 to 6 and the total number of carbon atoms in said ester is from 20 to 80.

3. A method according to claim 1 wherein said complex ester has the formula:

$$R_1—OOCR_2COO—(R_3—OOCR_4COO)_n—R_5$$

wherein $R_1$ and $R_5$ are alkyl radicals derived from materials of the group consisting of alkanols and alkanoic acids, $R_2$ and $R_4$ are alkyl radicals derived from alkandioic acids, $R_3$ and $R_6$ are selected from the group consisting of divalent hydrocarbon and hydrocarbon-oxy radicals, $n$ is a number from 1 to 6, and the total number of carbon atoms in said ester is from 20 to 80.

4. A method according to claim 1 wherein said complex ester has the formula:

$$R_1—(OOCR_2COO—R_3)_n—OOCR_5$$

wherein $R_1$ and $R_5$ are alkyl radicals derived from materials of the group consisting of alkanols and alkanoic acids, $R_2$ is an alkyl radical derived from an alkandioic acid, $R_3$ and $R_6$ are selected from the group consisting of divalent hydrocarbon and hydrocarbon-oxy radicals, $n$ is a number from 1 to 6 and the total number of carbon atoms in said ester is from 20 to 80.

5. A method according to claim 1 wherein said complex ester is one prepared by reacting two molar proportions of sebacic acid, two molar proportions of 2-ethyl hexanol and one molar proportion of polyethylene glycol.

6. A method according to claim 1 wherein said diester is dioctyl sebacate.

7. A method according to claim 1 wherein said paraffinic hydrocarbon solvent is hexane.

8. A method according to claim 1 wherein said paraffin hydrocarbon solvent is heptane.

9. A method according to claim 1 wherein said adsorbent is $Al_2O_3$.

10. A method according to claim 1 wherein said solvent is a $C_6$ to $C_{16}$ paraffinic hydrocarbon.

11. A method of improving the viscosity stability of a complex ester comprising blending 5 vol. percent of a complex ester prepared by reacting two molar proportions of sebacic acid, two molar proportions of 2-ethyl hexanol and one molar proportion of polyethylene glycol with 95 vol. percent of di(2-ethylhexyl) sebacate, treating the blend with 0.1 to 10 wt. percent of an adsorbent at a temperature of from 0 to 200° F. with agitation for approximately ½ to 10 hours and separating the adsorbent from the blend.

12. A method according to claim 11 wherein said adsorbent is alumina.

References Cited in the file of this patent

FOREIGN PATENTS

| 711,211 | Great Britain | June 30, 1954 |
| 758,838 | Great Britain | Oct. 10, 1956 |